(12) United States Patent
Hatsugai et al.

(10) Patent No.: US 8,205,581 B2
(45) Date of Patent: Jun. 26, 2012

(54) ENGINE DRIVEN POWER GENERATOR

(75) Inventors: Tsutomu Hatsugai, Saitama (JP);
Makoto Yamada, Saitama (JP); Takeshi Sasajima, Saitama (JP); Taiyo Onodera, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 12/402,129

(22) Filed: Mar. 11, 2009

(65) Prior Publication Data

US 2009/0229544 A1 Sep. 17, 2009

(30) Foreign Application Priority Data

Mar. 14, 2008 (JP) ................................. 2008-066742

(51) Int. Cl.
*F01P 1/00* (2006.01)
(52) U.S. Cl. ...................... 123/41.56; 290/1 A; 290/1 R
(58) Field of Classification Search ............... 123/41.56, 123/2, 3; 290/1 A, 1 R
See application file for complete search history.

(56) References Cited

U.S. PATENT DOCUMENTS

| | | | | |
|---|---|---|---|---|
| 3,580,228 A | * | 5/1971 | Rocha et al. | 123/18 A |
| 5,072,627 A | * | 12/1991 | Horiye et al. | 74/6 |
| 5,456,076 A | * | 10/1995 | Zornes | 60/525 |
| 6,450,846 B2 | * | 9/2002 | Morikami | 440/53 |
| 6,489,690 B1 | * | 12/2002 | Hatsugai et al. | 290/1 A |
| 6,975,042 B2 | * | 12/2005 | Yamada et al. | 290/1 R |
| 6,979,912 B2 | * | 12/2005 | Mazuka et al. | 290/1 A |
| 2003/0154934 A1 | * | 8/2003 | Nakamizo et al. | 123/41.56 |
| 2004/0021377 A1 | * | 2/2004 | Mazuka et al. | 310/59 |
| 2004/0209532 A1 | * | 10/2004 | Mori et al. | 440/6 |
| 2009/0044769 A1 | * | 2/2009 | Kubo et al. | 123/41.65 |

FOREIGN PATENT DOCUMENTS

| | | |
|---|---|---|
| CN | 1262396 A | 8/2000 |
| CN | 2547056 Y | 4/2003 |
| JP | 07-312846 A | 11/1995 |
| JP | 2002-309953 A | 10/2002 |

* cited by examiner

*Primary Examiner* — Noah Kamen
*Assistant Examiner* — Long T Tran
(74) *Attorney, Agent, or Firm* — Arent Fox LLP

(57) ABSTRACT

In an engine-driven power generator, a fan-equipped flywheel and a drive shaft of a power generation section are connected to a crankshaft of an engine, and the power generation section is driven by the drive shaft being driven via the crankshaft. The fan-equipped flywheel is disposed between a crankcase of the engine and the power generation section, and small- and large-diameter cooling fans for cooling the engine and power generation section are provided on the fan-equipped flywheel.

3 Claims, 6 Drawing Sheets

ENGINE DRIVEN POWER GENERATOR

CROSS-REFERENCE TO RELATED APPLICATION

This application claims the priority of Japanese Application No. 2008-066742, filed Mar. 14, 2008, the entire specification, claims and drawings of which are incorporated herewith by reference.

FIELD OF THE INVENTION

The present invention relates to an engine-driven power generator which has a flywheel and a drive shaft of a power generation section connected to a crankshaft of an engine, and which generates electric power by the drive shaft being rotated via the crankshaft.

BACKGROUND OF THE INVENTION

Among the conventionally-known engine-driven power generators are ones which have a drive shaft of a power generation section connected concentrically connected to a crankshaft of an engine, and in which a fan for cooling the engine and a fan for cooling the power generation section are provided separately from each other. More specifically, the engine cooling fan is provided on a portion of the engine opposite from the power generation section, and the power-generation-section cooling fan is provided between the engine and the power generation section. One example of such engine-driven power generators is disclosed in Japanese Patent Application Laid-Open Publication No. HEI-7-312846.

With the prior art engine-driven power generator disclosed in the No. HEI-7-312846 publication, external air can be directed, by rotation of the engine cooling fan, to a cylinder block etc. to cool the cylinder block etc. Further, external air can be directed, by rotation of the power-generation-section cooling fan, to the interior of the power generation section to cool the power generation section.

However, because the cooling fan of the engine and the cooling fan of the power generation section are provided separately from each other in the prior art engine-driven power generator, the engine-driven power generator requires many component parts to make the engine cooling fan and power-generation-section cooling fan, which would thus hinder reduction in weight and size of the engine-driven power generator. Further, the prior art engine-driven power generator would require many steps for individually attaching the engine cooling fan and power-generation-section cooling fan to predetermined portions of the power generator.

SUMMARY OF THE INVENTION

In view of the foregoing prior art problems, it is an object of the present invention to provide an improved engine-driven power generator which has a reduced weight and size and can be assembled with a reduced number of steps.

In order to accomplish the above-mentioned object, the present invention provides an improved engine-driven power generator, which comprises: a flywheel connected to a crankshaft of an engine; a power generation section having a drive shaft connected to the crankshaft of the engine, the power generation section being driven rotated by the drive shaft being rotated via the crankshaft, the flywheel being disposed between a crankcase of the engine and the power generation section; and a cooling fan provided on the flywheel for cooling the engine and the power generation section.

Because the single cooling fan for cooling both the engine and the power generation section is provided on the flywheel that is disposed between the crankcase of the engine and the power generation section, a fan for cooling the engine and a fan for cooling the power generation section, which had to be separate components in the prior art, can be integrated as the single cooling fan, and thus, the engine-driven power generator of the present invention can be significantly reduced in weight and size. Further, because there is no need to attach separate engine cooling and power-generation-section cooling fans individually to predetermined portions of the engine-driven power generator, the present invention can reduce the necessary number of steps for assembling the engine-driven power generator and thus achieve an enhanced productivity of the engine-driven power generator.

Further, in the present invention, the cooling fan is disposed radially inwardly of the flywheel. Thus, separate engine cooling and power-generation-section cooling fans need not be provided axially outwardly of the flywheel, and thus, the flywheel and the cooling fan can be provided as a single flywheel/cooling fan unit which has a small width substantially equal to the width of the flywheel. In this way, the flywheel/cooling fan unit in the engine-driven power generator of the invention can be constructed compactly.

Preferably, in the engine-driven power generator of the invention, the cooling fan comprises a small-diameter cooling fan disposed concentrically around and close to the axis of the flywheel, and a large-diameter cooling fan disposed radially outwardly of the small-diameter cooling fan. The cooling fan further comprises: a power-generation-section-cooling-air intake passage provided in the power generation section upstream of the small-diameter cooling fan for directing external air to the small-diameter cooling fan, to cool the power generation section by the air flowing along the power-generation-section-cooling-air intake passage; an engine-cooling-air intake passage provided upstream of the large-diameter cooling fan for directing air to the large-diameter cooling fan; and a cooling air delivery passage provided downstream of the small- and large-diameter cooling fans for directing the air from the small- and large-diameter cooling fans to the engine to thereby cool the engine.

Namely, in the engine-driven power generator arranged in the aforementioned manner, air can be taken into the power-generation-section-cooling-air intake passage, by rotation of the small-diameter cooling fan, to thereby cool the power generation section. Simultaneously, by rotation of the small- and large-diameter cooling fans, air directed via the power-generation-section-cooling-air intake passage and engine-cooling-air intake passage to the cooling fans can be delivered to the downstream cooling air delivery passage and then to the engine to thereby cool the engine.

Namely, with the single flywheel/cooling fan unit (i.e., fan-equipped flywheel) including the small- and large-diameter cooling fans, the present invention can cool not only the power generation section but also the engine. As a result, the weight and size of the engine-driven power generator can be significantly reduced.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
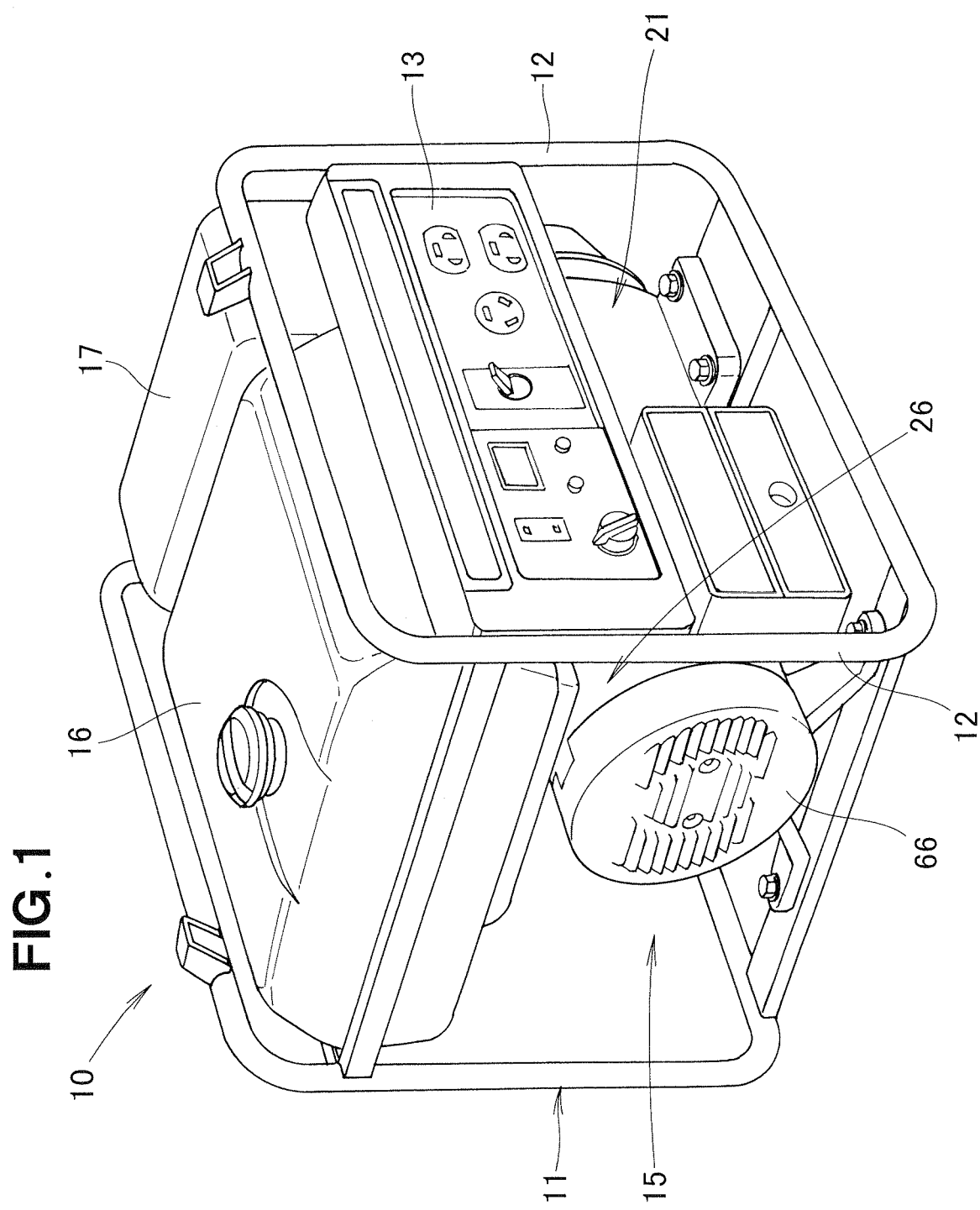
FIG. 1 is a perspective view showing an embodiment of an engine-driven power generator of the present invention.

FIG. 1 is a perspective view showing an embodiment of an engine-driven power generator of the present invention. The engine-driven power generator 10 comprises: a frame 11 constructed of a plurality of struts 12 etc. and having a substantial parallelepiped shape; a control panel 13 disposed between a pair of the struts 12; an engine/power generation section unit 15; and a fuel tank 16 and muffler 17 provide over the engine/power generation section unit 15. The control panel 13 has accommodated therein various electric and electronic component parts to constitute an engine control section and an electric power take-out section.

Figure 2:
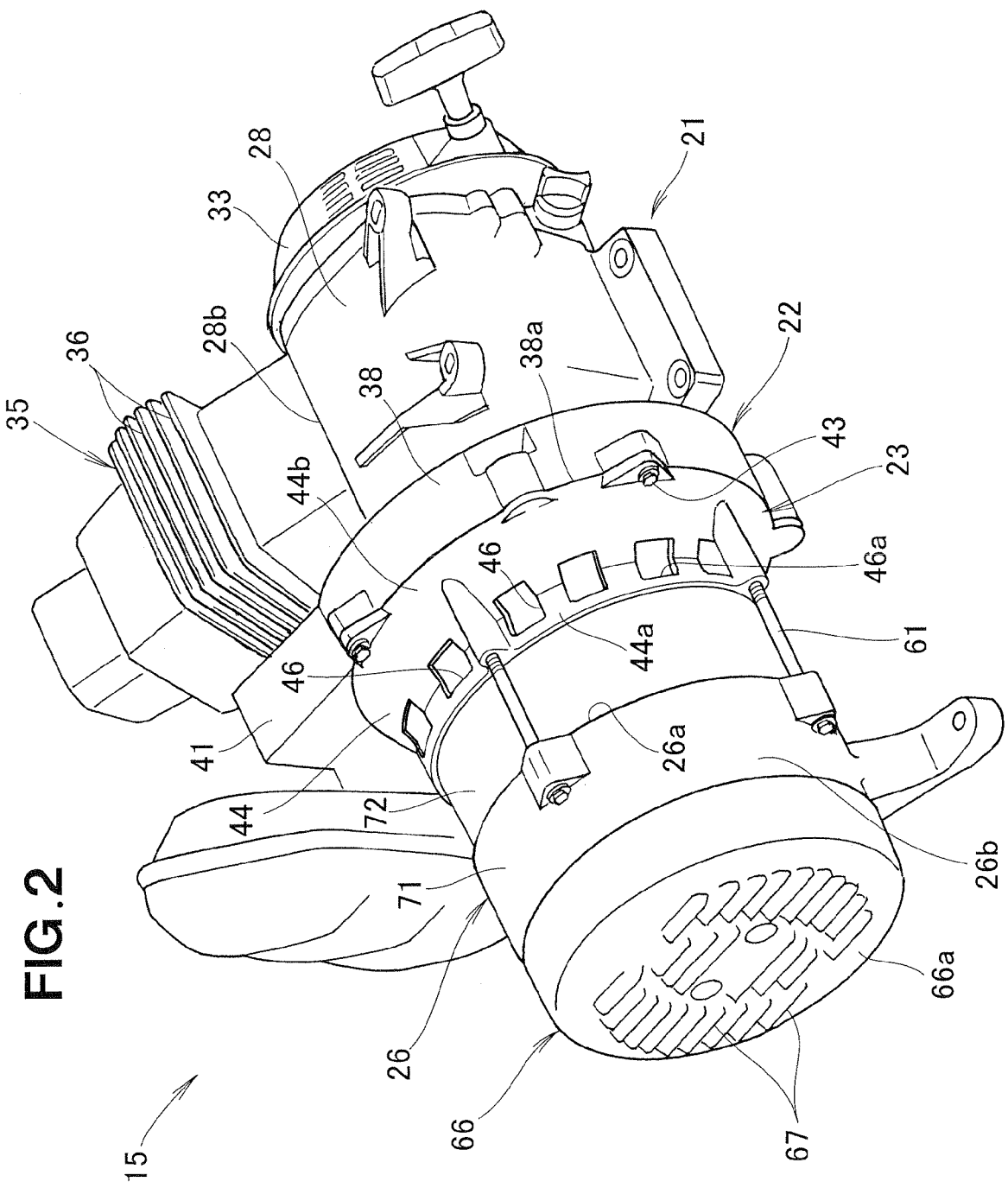
FIG. 2 is a perspective view showing an engine/power generation section unit employed in the engine-driven power generator.
Figure 3:
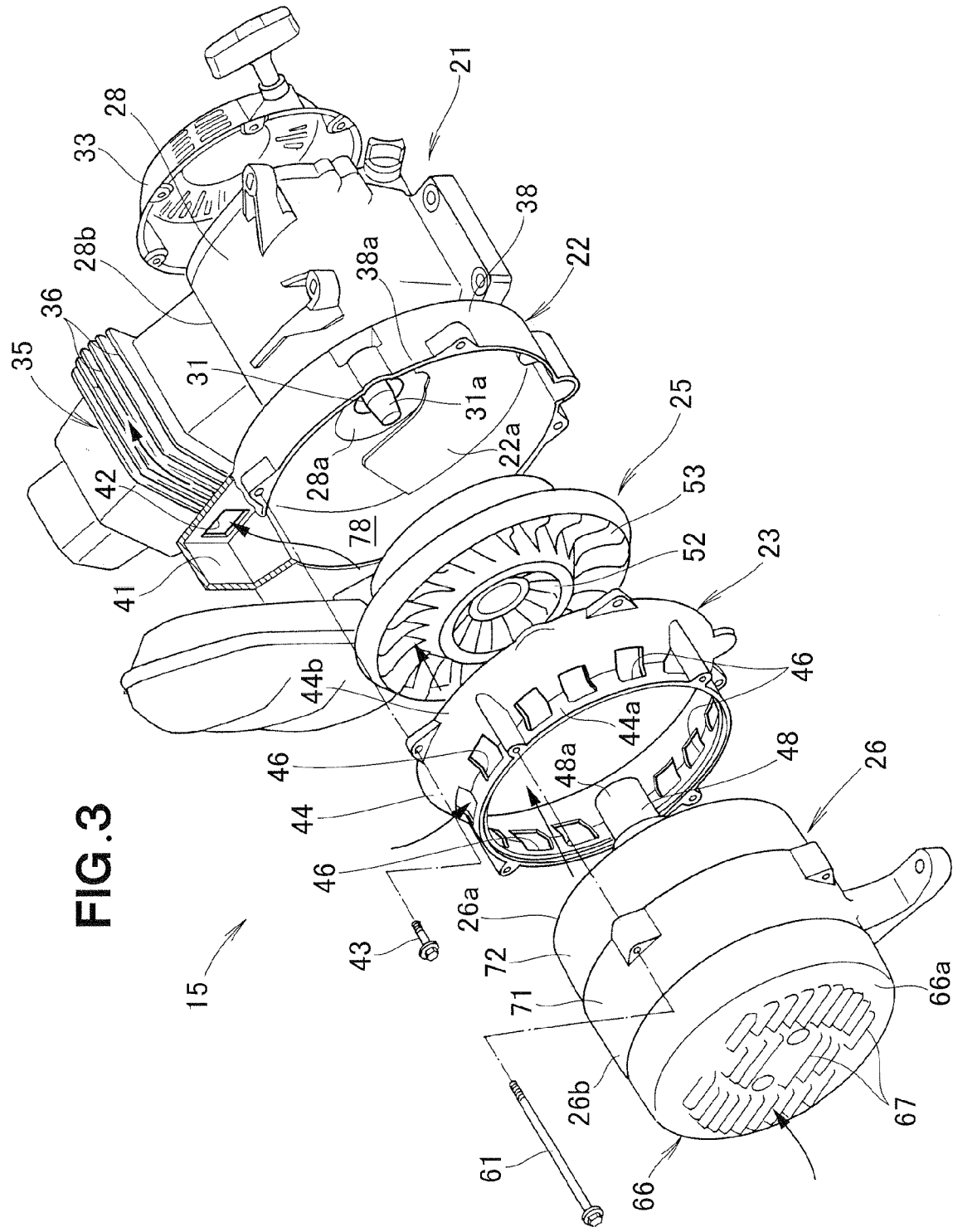
FIG. 3 is an exploded perspective view showing the engine/power generation section unit.

FIG. 2 is a perspective view showing the engine/power generation section unit 15, and FIG. 3 is an exploded perspective view showing the engine/power generation section unit 15.

The engine/power generation section unit 15 includes an engine 21, a first fan cover 22 attached to the engine 21, a second fan cover 23 attached to the first fan cover 22, a fan-equipped flywheel 25 disposed inside the first and second fan covers 22 and 23, and a power generation section 26 attached to the second fan cover 23.

The engine 21 has a crankshaft 31 rotatably supported within a crankcase 28 (see also FIG. 5), and a recoil starter (not shown) is connected coaxially to a rear end portion of the crankshaft 31 and covered with a recoil cover 33.

Further, in the engine 21, the crankshaft 31 has a front end portion 31a projecting forward beyond a front wall 28a of the crankcase 28 (see also FIG. 5), the first fan cover 22 is mounted on the front wall 28a concentrically with the crankcase 31, and a cylinder block 35 is fixed to a side portion 28b of the crankcase 28. The cylinder block 35, in which a cylinder (not shown) is accommodated, has a plurality of cooling fins 36 formed on its outer surface.

The first fan cover 22 has a rear wall portion 22a mounted on the front wall 28a of the crankcase 28, and a circumferential wall (hereinafter referred to as "first circumferential wall") 38 formed on and along the outer circumference of the rear wall portion 22a. The circumferential wall 38 is formed in parallel to the crankcase 31. The first fan cover 22 also includes a cooling air delivery passage 41 projecting from a portion of the first circumferential wall 38 along the cylinder block 35.

The cooling air delivery passage 41 has an air delivery (or blowing) opening 42 formed therein at a position facing the cylinder block 35. Thus, air can be delivered from the interior of the passage 41 into the cylinder block 35 through the air delivery opening 42. Because the first fan cover 22 is mounted on the front wall 28a of the crankcase 28, the cooling air delivery passage 41 is located adjacent to the engine 21.

The second fan cover 23 is fixed, by means of bolts 43, to the first fan cover 22 in coaxial relation thereto. The second fan cover 23 is formed in a cylindrical shape and has a circumferential wall (hereinafter referred to as "second circumferential wall") 44. The second circumferential wall 44 is formed in such a manner that its diameter gradually increases from a front end portion 44a toward a rear end portion 44b of the wall 44 (see also FIG. 5).

The second circumferential wall 44 is fixed at the rear end portion 44b to a front end portion 38a of the first circumferential wall 38 by means of bolts 43. The second circumferential wall 44 has a plurality of air intake (or drawing-in) ports 46 formed near the front end portion 44a at predetermined intervals along the circumference.

The fan-equipped flywheel 25 is provided inside the first and second fan covers 22 and 23. The first and second fan covers 22 and 23 are disposed between the crankcase 28 of the engine 21 and the power generation section 26, and thus, the fan-equipped flywheel 25 is disposed between the crankcase 28 of the engine 21 and the power generation section 26. In this way, fans 52 and 53 for cooling the engine 21 and the fan 52 for cooling the power generation section 26 can be constructed as a single unit.

Figure 4:
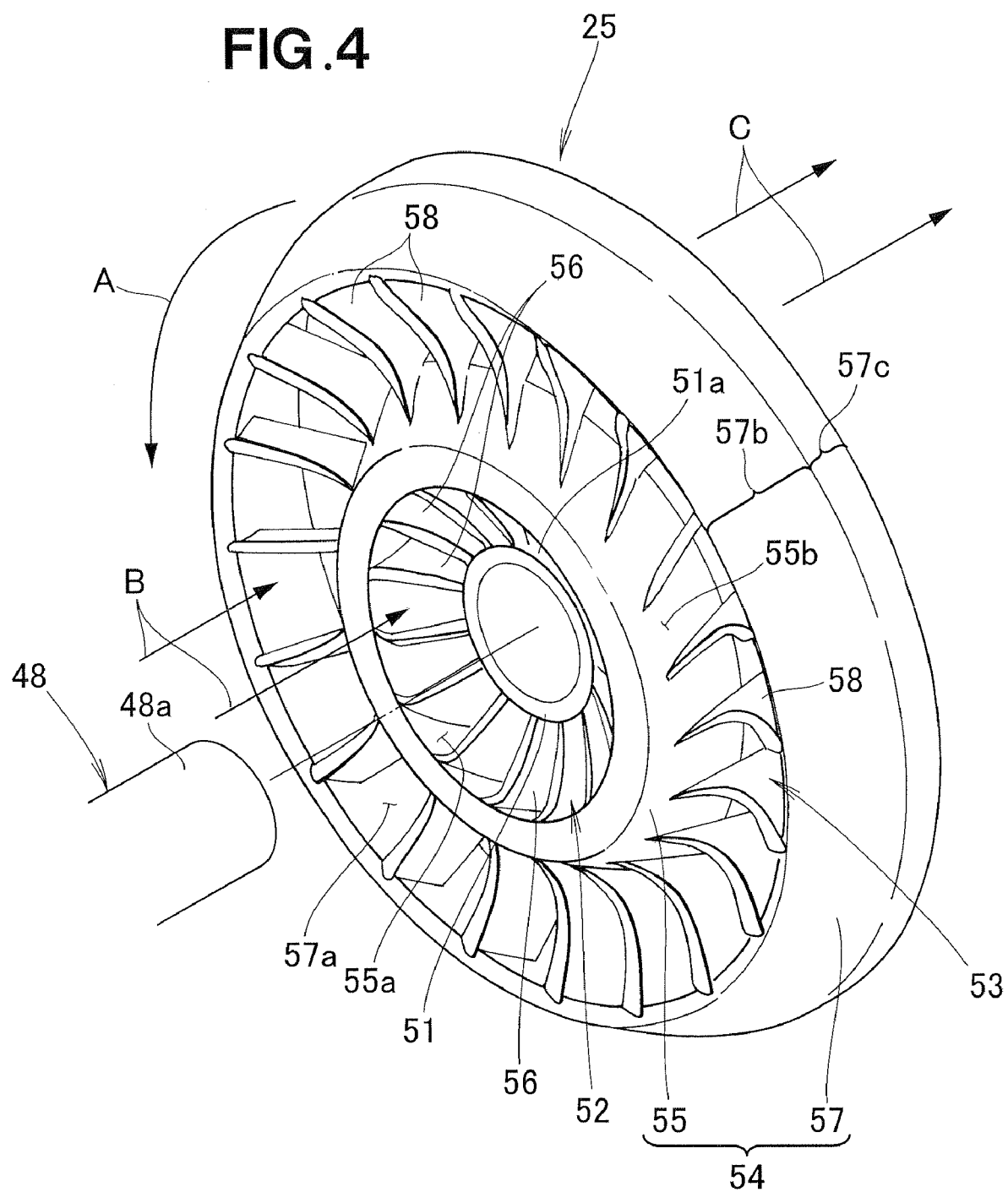
FIG. 4 is a perspective view showing a fan-equipped flywheel employed in the engine-driven power generator.
Figure 5:
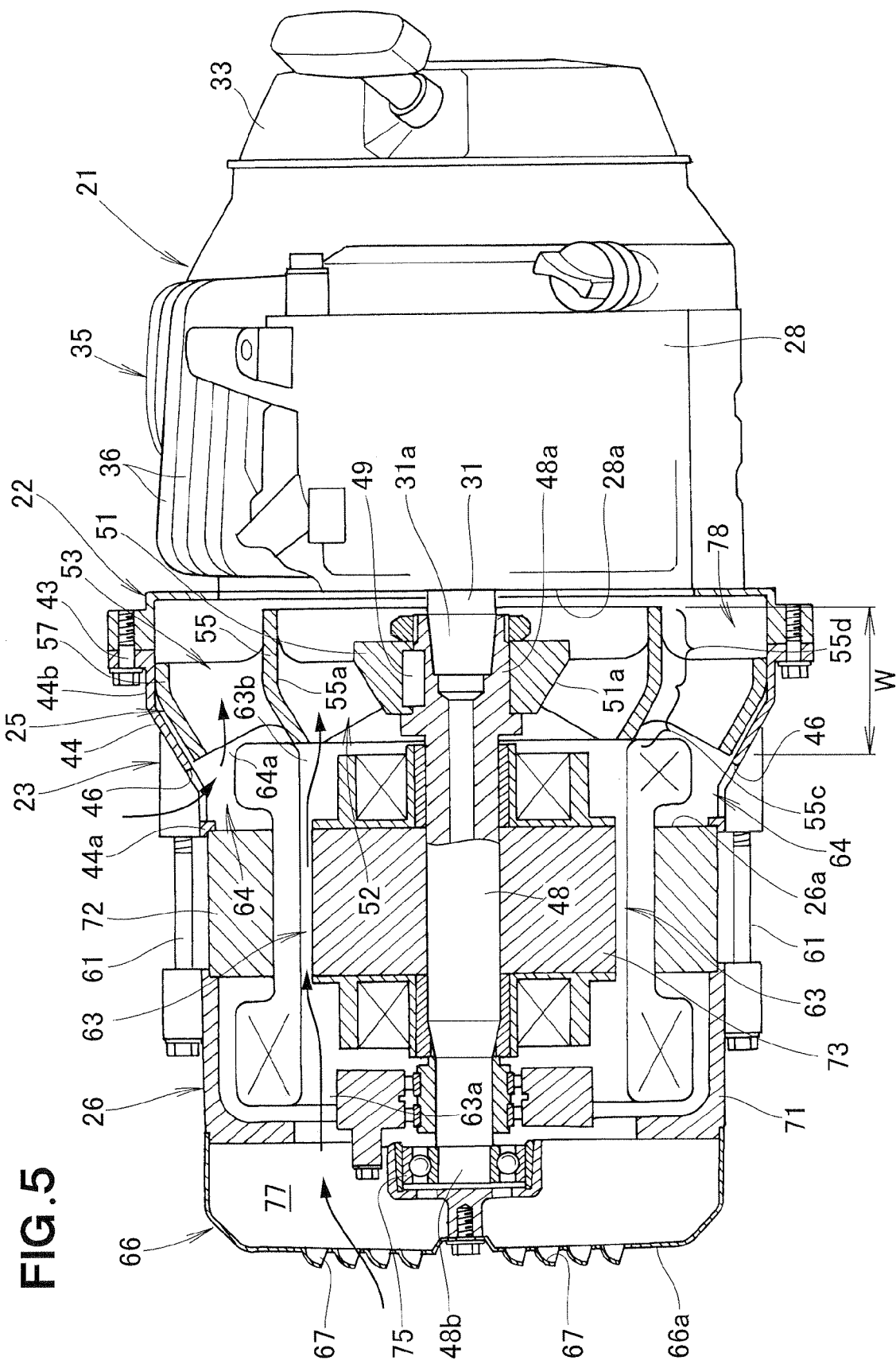
FIG. 5 is a sectional view showing the fan-equipped flywheel.

FIG. 4 is a perspective view showing the fan-equipped flywheel 25. The fan-equipped flywheel 25 is fitted over a rear end portion 48a of a drive shaft 48 of the power generation section 26 and fixed to the rear end portion 48a via a key 49 (FIG. 5). The drive shaft 48 projects rearwardly from a rear end portion 26a (FIG. 3) of the power generation section 26.

More specifically, the fan-equipped flywheel 25, which is for example formed integrally of gray cast iron (FC), has: a bearing section 51 fitted over the rear end portion 48a of the drive shaft 48; a small-diameter cooling fan 52 extending radially outward from the bearing section 51; a small-diameter ring 55 provided on the outer periphery of the small-diameter cooling fan 52; a large-diameter cooling fan 53 extending radially outward from the small-diameter 55; and a large-diameter ring 57 provided on the outer periphery of the large-diameter cooling fan 53.

The bearing section 51 and the drive shaft 48 are interconnected, by means of the key 49 (see FIG. 5), in such a manner that the bearing section 51 and the drive shaft 48 are rotatable together as a unit.

The small-diameter cooling fan 52 has a plurality of small vanes 56 extending radially outward from the bearing section 51 to the inner surface 55a of the small-diameter ring 55. Namely, the small-diameter cooling fan 52 is disposed radially inwardly of the small-diameter ring 55 and close to the axis of the flywheel 25. The small-diameter cooling fan 52 is a fan for not only sucking or taking in air for cooling the power generation section 26, but also sending out or delivering air for cooling the engine 21 (see FIG. 3).

The large-diameter cooling fan 53 has a plurality of large vanes 58 extending radially outward from the small-diameter ring 55 to the large-diameter ring 57. Namely, the large-diameter cooling fan 53 is disposed radially inwardly of the large-diameter ring 57. The large-diameter cooling fan 53 is a fan for delivering air for cooling the engine 21 (see FIG. 3).

Further, the small-diameter ring 55 and the large-diameter ring 57 together constitute a flywheel ring section 54. The flywheel ring section 54 is a section that absorbs and discharges rotational energy of the crankshaft 31 in conjunction with the bearing section 51 and the cooling fans 52 and 53.

Namely, the fan-equipped flywheel 25 has, in addition to the flywheel, the engine cooling fan 52 and the power-generation-section cooling fan 53 constructed together as an integral unit. In this way, the instant embodiment of the engine-driven power generator 10 can be reduced in weight and size.

Further, with the cooling fans 52 and 53 provided for cooling the engine 21 and the cooling fan 52 provided for cooling the power generation section 26 constructed together as an integral unit, it is possible to eliminate the need for individually attaching the cooling fans 52 and 53 to predetermined portions and thus reduce the necessary number of steps for assembling the engine-driven power generator 10, with the result that productivity of the engine-driven power generator 10 can be significantly enhanced.

Further, in the engine-driven power generator 10, the small-diameter cooling fan 52 is disposed radially inwardly of the flywheel ring section 54 (more specifically, small-diameter ring 55), and the large-diameter cooling fan 53 is disposed radially inwardly of the flywheel ring section 54 (more specifically, large-diameter ring 57).

Namely, the cooling fans 52 and 53 need not be provided axially outward of the flywheel, and thus, the fan-equipped flywheel 25 can have a reduced width W (see FIG. 5). In this way, the fan-equipped flywheel 25 can be constructed compactly.

As the fan-equipped flywheel 25 is rotated as indicated by arrow A by rotation of the drive shaft 48, the small- and large-diameter cooling fans 52 and 53 can suck or take in air as indicated by arrow B, and the thus taken-in air can be delivered as indicated by arrow C.

The small-diameter ring 55 is formed in such a manner that its diameter of its substantial front half portion 55c (see FIG. 5) gradually increases in a front-to-rear direction and that its substantial rear half portion 55d (see FIG. 5) extends in parallel to the drive shaft 48. Further, the large-diameter ring 57 is formed in such a manner that a diameter of its substantial front half portion 57b gradually increases in a front-to-rear direction and that its substantial rear half portion 57c extends in parallel to the drive shaft 48.

Thus, the small-diameter cooling fan 52 communicates at its front end portion with a power-generation-section-cooling-air intake passage 63 (FIG. 5) while the large-diameter cooling fan 53 communicates at its front end portion with an engine-cooling-air intake passage 64. Further, rear end portions of the small-diameter ring 55 and large-diameter ring 57 communicate with the cooling air delivery passage 41 (FIG. 3).

As noted above, the cooling air delivery passage 41 is provided in the first fan cover 22. Thus, the cooling air delivery passage 41 is located adjacent to the engine 21 and operatively connected to the small- and large-diameter cooling fans 52 and 53.

Referring back to FIGS. 2 and 3, the power generation section 26 is fixed at the rear end portion 26a to a front end portion 44a of the second fan cover 23 (circumferential wall 44), having accommodated therein the fan-equipped flywheel 25, by means of bolts 61.

Cover 66 is attached to a front end portion 26b of the power generation section 26, and the cover 66 has louvers 67 formed in a front end portion 66a thereof. The louvers 67 comprise narrow openings that communicate with the power-generation-section-cooling-air intake passage 63 to direct external air to the passage 63.

FIG. 5 is a sectional view showing the fan-equipped flywheel 25. The power generation section 26 has a stator 72 mounted to a case 71 in abutment against the front end portion 44a of the second fan cover 23 (circumferential wall 44), and the case 71 is fixed to the second fan cover 23 by means of the bolts 61.

In the power generation section 26, a rotor 73 is provided inside the stator 72 and connected concentrically with the drive shaft 48 in such a manner that it can rotate together with the drive shaft 48. The drive shaft 48 has a rear end portion 48a concentrically connected with a front end portion 31a of the crankshaft 31, and a front end portion 48b rotatably supported on a bearing 75. Thus, as the crankshaft 31 rotates, the drive shaft 48 rotates so that the rotor 73 can rotate to generate electric power.

In the power generation section 26, the power-generation-section-cooling-air passage 63 is provided by a space defined by the stator 72 and the rotor 73. The power-generation-section-cooling-air passage 63 has an intake port 63a communicating with an interior space 77 of the cover 66, and an air delivery port 63b communicating with an interior space of the second fan cover 23.

The power-generation-section-cooling-air passage 63 is formed in such a manner that its air delivery port 63b faces the small-diameter cooling fan 52 of the fan-equipped fly wheel 25. The interior space 77 of the cover 66 communicates with the outside via the louvers 67. Further, the interior space of the second fan cover 23 communicates with the cooling-air delivery passage 41 via an interior space 78 of the first fan cover 22.

In the instant embodiment, the fan-equipped fly wheel 25 is disposed inside the first and second fan covers 22 and 23 and mounted on the drive shaft 48. Thus, as the drive shaft 48 rotates via the crankshaft 31, the fan-equipped fly wheel 25 rotates together with the drive shaft 48.

As the fan-equipped fly wheel 25 rotates in the aforementioned manner, the small-diameter cooling fan 52 not only delivers air to the interior space 78 of the first fan cover 22 but also takes in air from the power-generation-section-cooling-air intake passage 63.

Further, the engine-cooling-air intake passage 64 is a flow passage which has the plurality of intake ports 46 communicating with the interior space of the second fan cover 23 and which directs external air, taken in through the intake ports 46, to the interior space of the second fan cover 23. The engine-cooling-air passage 64 is formed in such a manner that its air delivery port 64a faces the large-diameter cooling fan 53 of the fan-equipped fly wheel 25.

As the fan-equipped fly wheel 25 rotates in the aforementioned manner, the large-diameter cooling fan 53 not only delivers air to the interior space 78 of the first fan cover 22 but also takes in air from the engine-cooling-air intake passage 64. In this way, external air can be taken in through the intake ports 46 as indicated by arrows and directed to the large-diameter cooling fan 53 via the engine-cooling-air intake passage 64.

Further, in the fan-equipped fly wheel 25, the small- and large-diameter cooling fans 52 and 53 have their respective rear portions facing the interior space 78 of the first fan cover 22. Thus, as the fan-equipped fly wheel 25 rotates, air can be delivered via the small-diameter cooling fan 52 to the interior space 78 of the first fan cover 22 and also delivered via the large-diameter cooling fan 53 to the interior space 78.

The interior space 78 of the first fan cover 22 is in communication with the cooling air delivery passage 41 (FIG. 3) of the engine 21. Thus, the air delivered from the small- and large-diameter cooling fans 52 and 53 can be directed to the cooling air delivery passage 41 and then into the cylinder block 35 through the air delivery opening 42 shown in FIG. 3.

In the instant embodiment of the engine-driven power generator 10, as set forth above, the power-generation-section-cooling-air intake passage 63 is provided in the power generation section 26, i.e. upstream of the small-diameter cooling fan 52, and the engine-cooling-air intake passage 64 is provided upstream of the large-diameter cooling fan 53. Further, by rotation of the small-diameter cooling fan 52, air can be taken into the power-generation-section-cooling-air intake passage 63 to thereby cool the power generation section 26. Simultaneously, by rotation of the small- and large-diameter cooling fans 52 and 53, air directed via the power-generation-section-cooling-air intake passage 63 and engine-cooling-air intake passage 64 to the cooling fans 52 and 53 is delivered to the cooling air delivery passage 41 to thereby cool the engine 21.

In the aforementioned manner, both the power generation section 26 and the engine 21 can be cooled by the single fan-equipped fly wheel 25. Thus, the engine-driven power generator 10 can be significantly reduced in weight and size.

Next, with reference to FIGS. 6A and 6B, a description will be given about how the engine 21 and power generation section 26 are cooled by the engine-driven power generator 10.

Figure 6A:
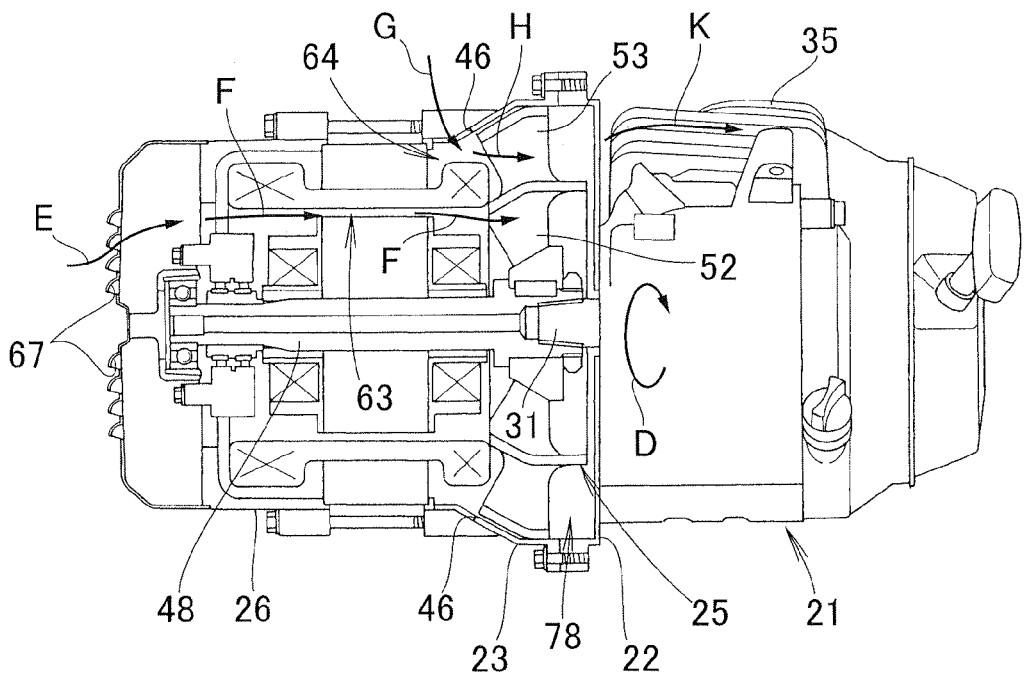
FIGS. 6A and 6B are views explanatory of how the engine and power generation section are cooled in the engine-driven power generator.

As the crankshaft 31 rotates as indicated by arrow D by driving of the engine 21, the drive shaft 48 and hence the fan-equipped fly wheel 25 also rotates as indicated by arrow D, as shown in FIG. 6A.

By the rotation of the fan-equipped fly wheel 25, external air is taken in to the power-generation-section-cooling-air intake passage 63 through the louvers 67 as indicated by arrow E. The air thus taken in to the power-generation-section-cooling-air intake passage 63 is further taken in to the small-diameter cooling fan 52 of the fly wheel 25 as indicated by arrow F. Simultaneously, by the rotation of the fan-equipped fly wheel 25, external air is taken in to the engine-cooling-air intake passage 64 through the intake ports 46 as indicated by arrow G. The air thus taken in to the engine-cooling-air intake passage 64 is further taken in to the large-diameter cooling fan 53 of the fly wheel 25 as indicated by arrow H.

Figure 6B:
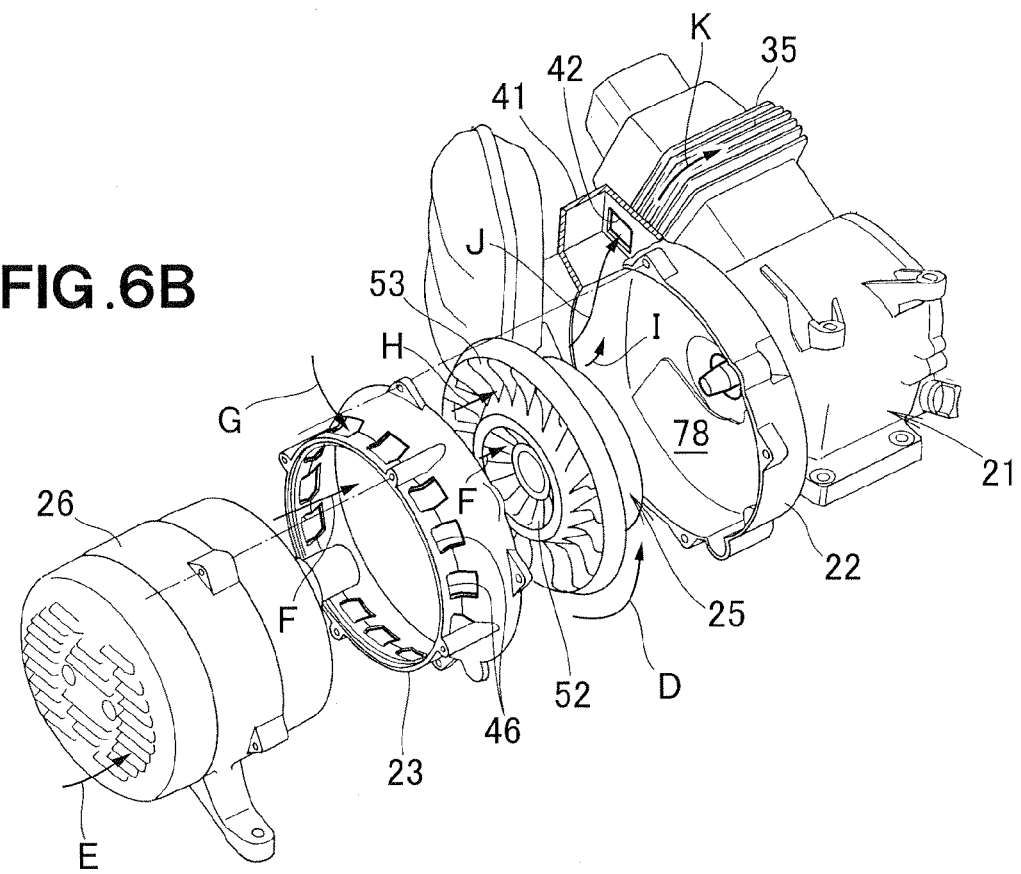

The air taken in to the small-diameter cooling fan 52 via the power-generation-section-cooling-air intake passage 63 and the air taken in to the large-diameter cooling fan 53 via the engine-cooling-air intake passage 64 is delivered by the small- and large-diameter cooling fans 52 and 53 to the interior space 78 of the first fan cover 22 as indicated by arrow I in FIG. 6B, so that these air is mixed together in the interior space 78. The air having been mixed together in the interior space 78 is then delivered from the interior space 78 to the cooling air delivery passage 41 as indicated by arrow J.

The air thus delivered to the cooling air delivery passage 41 is further delivered through the air delivery opening 42 to the cylinder block 35 as indicated by arrow K. Thus, the cylinder block 35 is cooled by the air, after which the air having cooled the cylinder block 35 is discharged out of the power generator 10.

Whereas the preferred embodiment of the present invention has been described as including two cooling fans, i.e. small- and large-diameter cooling fans 52 and 53, the present invention is not so limited; for example, the small- and large-diameter cooling fans 52 and 53 may be constructed as a single, integral cooling fan.

The present invention is particularly suited for application to engine-driven power generators which have a flywheel and a drive shaft of a power generation section connected to a crankshaft of an engine, and in which the power generator is driven by the drive shaft being rotated via the crankshaft.

Obviously, various minor changes and modifications of the present invention are possible in light of the above teaching. It is therefore to be understood that within the scope of the appended claims the invention may be practiced otherwise than as specifically described.

What is claimed is:

1. An engine-driven power generator comprising:
a flywheel connected to a crankshaft of an engine;
a power generation section having a drive shaft connected to the crankshaft of the engine, the power generation section being driven rotated by the drive shaft being rotated via the crankshaft, the flywheel being disposed between a crankcase of the engine and the power generation section; and
a cooling fan provided on the flywheel for cooling the engine and the power generation section, wherein the cooling fan includes a first cooling fan encompassed by a second cooling fan.

2. The engine-driven power generator according to claim 1, wherein the cooling fan is disposed radially inwardly of the flywheel.

3. The engine-driven power generator according to claim 1, wherein the first cooling fan comprises a small-diameter cooling fan disposed concentrically around and close to an axis of the flywheel, and the second cooling fan comprises a large-diameter cooling fan, and which further comprises:
a power-generation-section-cooling-air intake passage provided in the power generation section upstream of the small-diameter cooling fan for directing external air to the small-diameter cooling fan to thereby cool the power generation section;
an engine-cooling-air intake passage provided upstream of the large-diameter cooling fan for directing external air to the large-diameter cooling fan; and
a cooling air delivery passage provided downstream of the small- and large-diameter cooling fans for directing the air from the small- and large-diameter cooling fans to the engine to thereby cool the engine.

* * * * *